United States Patent

Schmidt et al.

[11] Patent Number: 5,695,252
[45] Date of Patent: Dec. 9, 1997

[54] MOTOR-VEHICLE HEAD REST

[75] Inventors: Reinhard Schmidt, Lennestadt; Wolfgang Stenzel, Einbeck; Hermann Griech, Staufenberg, all of Germany

[73] Assignee: R. Schmidt GmbH, Lennestadt, Germany

[21] Appl. No.: 621,117

[22] Filed: Mar. 25, 1996

[30] Foreign Application Priority Data

Mar. 24, 1995 [DE] Germany ............... 195 10 788.8

[51] Int. Cl.⁶ ............................................... A47C 1/10
[52] U.S. Cl. ............................. 297/408; 297/391
[58] Field of Search ............... 297/DIG. 2, 391, 297/408; 29/428

[56] References Cited

U.S. PATENT DOCUMENTS

| 4,779,929 | 10/1988 | Kuchemann | 297/391 X |
| 5,180,207 | 1/1993 | Schmidt | 297/408 |
| 5,199,765 | 4/1993 | Garmendia et al. | 297/391 |

FOREIGN PATENT DOCUMENTS

| 2755411 | 6/1979 | Germany | 297/408 |
| 3021122 | 12/1981 | Germany | 297/408 |
| 3200321 | 7/1983 | Germany | 297/408 |
| 3226149 | 1/1984 | Germany | 297/391 |
| 4118349 | 12/1991 | Germany | 297/408 |
| 2161702 | 1/1986 | United Kingdom | 297/408 |

*Primary Examiner*—Milton Nelson, Jr.
*Attorney, Agent, or Firm*—Herbert Dubno; Andrew Wilford

[57] ABSTRACT

A motor-vehicle head rest has a one-piece plastic body formed with a pair of like recesses opening parallel to each other, and respective pivot assemblies in each recess. Each such pivot assembly has a holder and a pivot element held in the holder. Interengaging formations on the body and holder retain the holders in the recesses, and respective rods engage up through the pivot elements of the assemblies. Such a head rest is made by fitting the holders to the respective pivot elements, engaging the holders carrying the respective pivot elements into the respective recesses and thereby interengaging the formations and locking the holders with their pivot elements in the respective recesses, and fitting the rods through the pivot elements.

7 Claims, 2 Drawing Sheets

MOTOR-VEHICLE HEAD REST

FIELD OF THE INVENTION

The present invention relates to a motor-vehicle head rest. More particularly this invention concerns a mount for such a head rest and a method of assembling the head rest.

BACKGROUND OF THE INVENTION

A standard motor-vehicle head rest has a body that is mounted on two parallel stop pins or rods that project up from the back of the seat. Normally the body is made of two molded plastic parts. An assembly comprised of a pivot joint, its holder, and if necessary a friction element is mounted on each rod, then the joint assemblies are fitted to a cavity in one of the plastic parts, the other part is fitted over it, and the two parts are welded together. While the finished product is excellent, this fabrication system, which is necessitated by the way the joint holder is held in two confronting cavities of the two plastic parts, is excessively complex. In particular it is difficult to weld together the two plastic parts in situ.

OBJECTS OF THE INVENTION

It is therefore an object of the present invention to provide an improved motor-vehicle head rest.

Another object is the provision of such an improved motor-vehicle head rest which overcomes the above-given disadvantages, that is which is of simple and easy-to-assemble construction.

A further object is to provide an improved method of assembling the inventive head rest.

SUMMARY OF THE INVENTION

A motor-vehicle head rest has according to the invention a one-piece plastic body formed with a pair of like recesses opening parallel to each other, and respective pivot assemblies in each recess. Each such pivot assembly has a holder and a pivot element held in the holder. Interengaging formations on the body and holder retain the holders in the recesses, and respective rods engage up through the pivot elements of the assemblies. Such a head rest is made by fitting the holders to the respective pivot elements, engaging the holders carrying the respective pivot elements into the respective recesses and thereby interengaging the formations and locking the holders with their pivot elements in the respective recesses, and fitting the rods through the pivot elements.

Thus it is possible to use a one-piece body and to completely eliminate the step of welding together its two halves. The resultant assembly lacks a weld joint so it is more attractive and stronger than the prior-art systems, and can be produced at substantially lower cost.

The formations according to the invention include at least one inwardly open cutout in each recess and at least one complementary and outwardly directed bump or barb on each holder. In addition each assembly further has a friction body braced between the holder and the respective pivot element or rod. This friction body prevents the head rest from pivoting too freely on the rod, normally about an axis perpendicular to the rod.

Each holder according to the invention is formed with a cavity holding the respective pivot element. In addition each holder has top, bottom, and side walls and forms an outwardly open cavity receiving the respective pivot element. The cavity is closed by the body when the holder is installed in the respective recess.

The one-piece plastic body in accordance with this invention is formed unitarily with a pair of generally parallel legs having inner ends each formed with a respective one of the recesses and outer ends, an outer cross piece extending between the outer ends, an inner cross piece extending from one of the inner ends to the other inner end, and coupling formations on the inner cross piece and other inner end for connecting same together. Thus to start with the body is formed as an open ring, making it very easy to slip a tubular and padded textile cover over it. Once the cover is in place, the formations are snapped together to form the standard annular formation.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
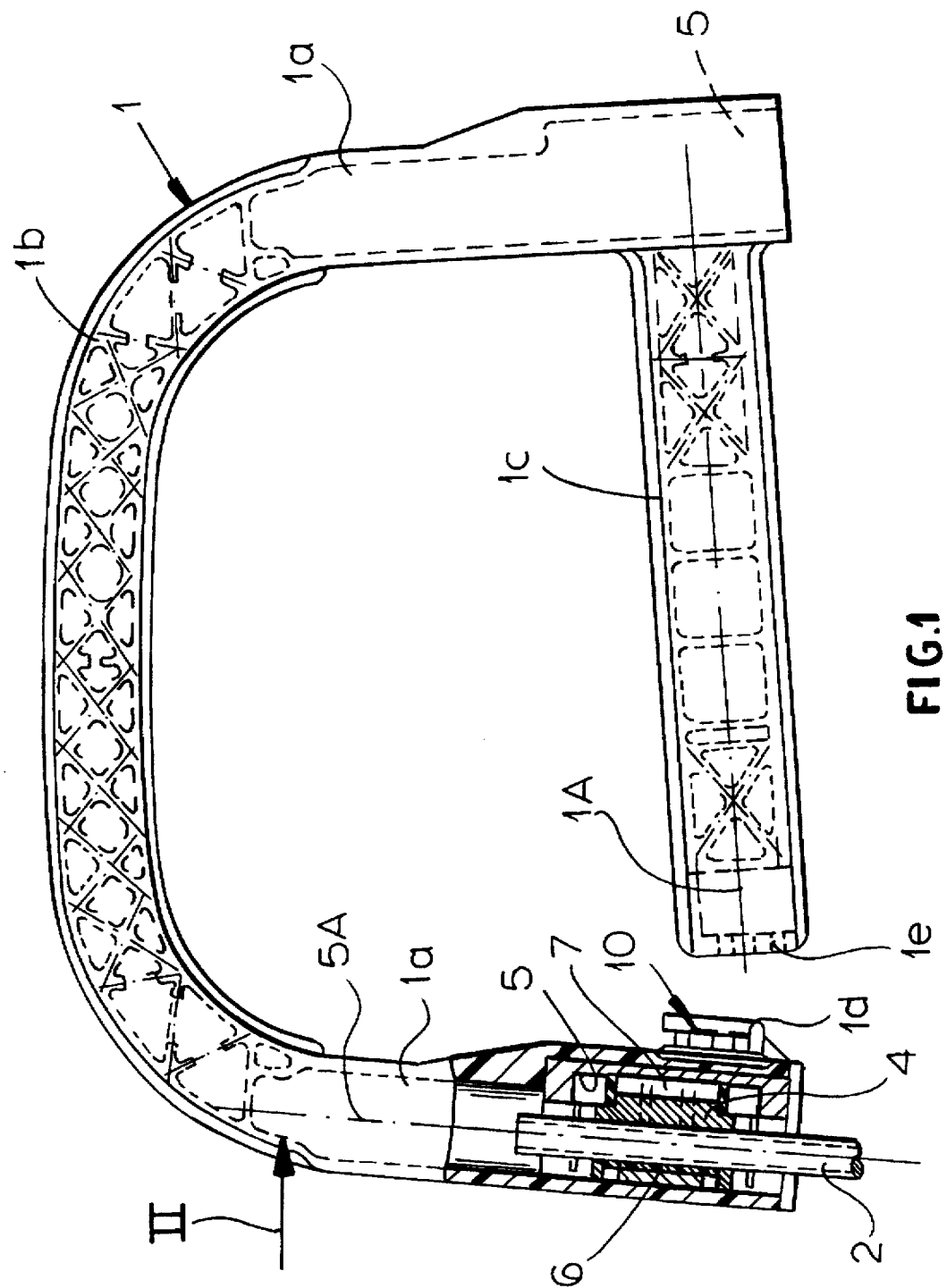
FIG. 1 is a side view partly in section of the head rest according to the invention.
Figure 2:
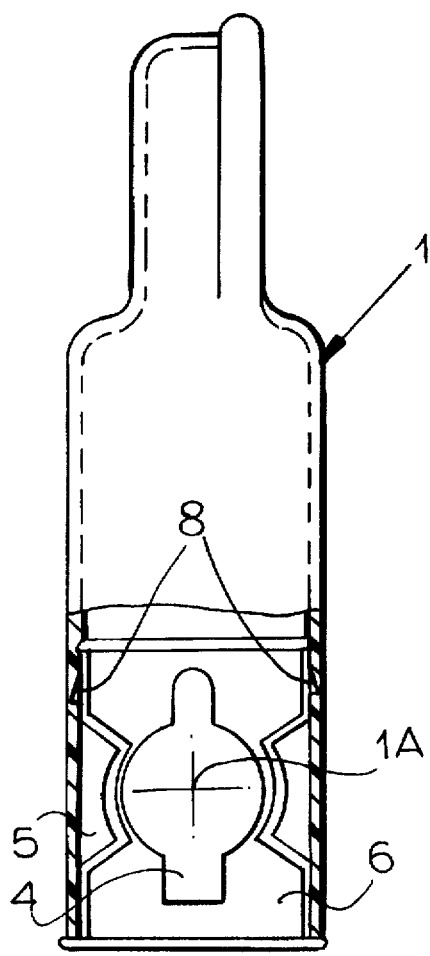
FIG. 2 is a partly sectional side view of the head rest as indicated by arrow II of FIG. 1.
Figures 1A, 1B:
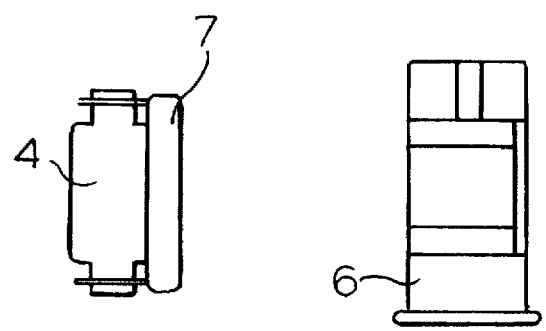
FIGS. 1A and 1B are views of details of FIG. 1.
Figure 2A:
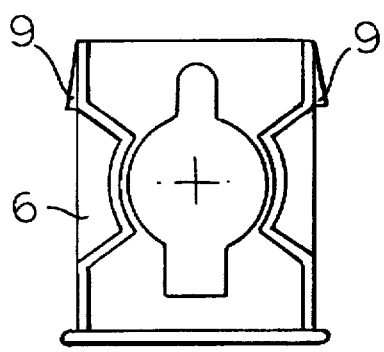
FIGS. 2A and 2B are views of details of FIG. 2.
Figure 2B:
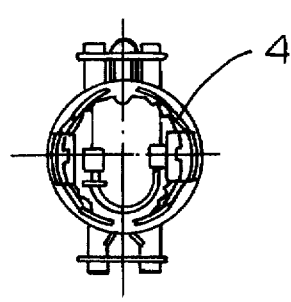

As seen in FIG. 1 a head rest according to the invention comprises a one-piece plastic body 1 having a pair of normally parallel legs 1a connected by an upper crosspiece 1b. A lower crosspiece 1c extends along a pivot axis 1A perpendicular to the two legs 1a from one of the legs 1a and can be connected via appropriate interfitting snap formations 1d and 1e with the other leg 1a.

Each leg 1a is formed with a respective recess 5 open along and centered on a respective axis 5A perpendicular to the axis 1A. Each such recess 5 contains an assembly comprised of a one-piece plastic holder 6, a pivot element 4, and a friction or spring member 7. Respective rods 2 projecting upward from a seat back fit through the pivot elements 4 and rubbing the members 7 and the pivot elements 4 can normally pivot limitedly about the axis 1A in the holders 6.

Each recess 5 is formed with a pair of retaining formations 8 in the form of right-triangular recesses into which can engage further formations 9 in the form of complementary barbs on the holder 6. The holder 6 itself has top, bottom, and side walls with one of the side walls open so that the parts 4 and 7 can be fitted inside it.

The system is assembled by mounting the pivot elements 4 and members 7 in the respective holders 6 and then forcing these holders 6 into the respective recesses 5, with the formations 8 and 9 interengaging and holding the assemblies 4–7 in place. The rods 2 can then be fitted through the pivots 4, although if these rods 2 are threaded as shown they can be screwed through the assemblies 4–7 before same are fitted in to the recesses 5.

We claim:

1. A motor-vehicle head rest comprising:
   a one-piece plastic body formed with a pair of like recesses opening parallel to each other;
   respective assemblies in each recess, each assembly having a holder having top, bottom, and side walls forming an outwardly open cavity, and a pivot element held in and closing the cavity of the respective holder;

interengaging formations on the body and holders retaining the holders in the respective recesses; and respective rods engaged up through the pivot elements of the assemblies.

2. The motor-vehicle head rest defined in claim 1 wherein the formations include at least one inwardly open cutout in each recess and at least one complementary and outwardly directed bump on each holder.

3. The motor-vehicle head rest defined in claim 1 wherein each assembly further has a friction body braced between the holder and the respective rod.

4. A motor-vehicle head rest comprising:

a body formed unitarily with
  a pair of like recesses opening parallel to each other,
  a pair of generally parallel legs having inner ends each formed with a respective one of the recesses and outer ends,
  an outer cross piece extending between the outer ends,
  an inner cross piece extending from one of the inner ends to the other inner end, and
  coupling formations on the inner cross piece and other inner end for connecting same together;

respective assemblies in each recess, each assembly having
  a holder, and
  a pivot element held in the holder;

interengaging formations on the body and holders retaining the holders in the respective recesses; and respective rods engaged up through the pivot elements of the assemblies.

5. The motor-vehicle head rest defined in claim 4 wherein each holder is formed with a cavity holding the respective pivot element.

6. The motor-vehicle head rest defined in claim 5 wherein each holder has top, bottom, and side walls and forms an outwardly open cavity receiving the respective pivot element, each cavity being closed by the respective body when the respective holder is installed in the respective recess.

7. A method assembling a motor-vehicle head rest comprising:

a one-piece plastic body formed with a pair of like recesses opening parallel to each other;

respective assemblies in each recess, each assembly having
  a holder having a laterally open cavity, and
  a pivot element held in the cavity of the respective holder;

interengaging formations on the body and holder retaining the holders in the recesses; and respective rods engaged up through the pivot elements of the assemblies, the method comprising the steps of:

fitting the holders to the respective pivot elements;

engaging the holders carrying the respective pivot elements into the respective recesses and thereby interengaging the formations and locking the holders with their pivot elements in the respective recesses; and fitting the rods through the pivot elements and thereby laterally closing the cavities with walls of the body.

* * * * *